United States Patent [19]

Arzoumanidis et al.

[11] Patent Number: 5,081,090
[45] Date of Patent: Jan. 14, 1992

[54] DRY OLEFIN POLYMERIZATION CATALYST

[75] Inventors: Gregory G. Arzoumanidis; Habet M. Khelghatian, both of Naperville; Linda Ornellas, Woodridge, all of Ill.

[73] Assignee: Amoco Corporation, Chicago, Ill.

[21] Appl. No.: 557,139

[22] Filed: Jul. 23, 1990

[51] Int. Cl.⁵ ............................................. C08F 4/654
[52] U.S. Cl. .................................. 502/126; 502/118; 502/121; 502/122; 502/123; 502/124; 502/125; 502/127; 502/133; 502/107; 502/120; 526/124
[58] Field of Search ............... 502/118, 121, 122, 123, 502/124, 125, 126, 127, 133, 107, 120

[56] References Cited

U.S. PATENT DOCUMENTS

| | | | |
|---|---|---|---|
| 4,540,679 | 9/1985 | Arzoumanidis et al. | 502/133 X |
| 4,612,299 | 9/1986 | Arzoumanidis et al. | 502/133 X |
| 4,866,022 | 9/1989 | Arzoumanidis et al. | 502/126 X |
| 4,946,816 | 8/1990 | Cohen et al. | 502/126 |
| 4,988,656 | 1/1991 | Arzoumanidis et al. | 502/127 |
| 5,013,702 | 5/1991 | Arzoumanidis et al. | 502/133 X |

*Primary Examiner*—Patrick P. Garvin
*Attorney, Agent, or Firm*—Wallace L. Oliver; William H. Magidson; Ralph C. Medhurst

[57] ABSTRACT

A solid hydrocarbon-insoluble, alpha-olefin polymerization catalyst component with superior activity, stereospecificity and morphology characteristics comprising the product formed by A) forming a solution of a magnesium-containing species from a magnesium alkyl (or hydrocarbyl) carbonate or a magnesium carboxylate; B) precipitating solid particles from such solution by treatment with a transition metal halide; C) reprecipitating such solid particles from a mixture containing a cyclic ether; D) treating the reprecipitated particles with a transition metal compound and an electron donor; and E) drying the resulting solid particles such that the residual volatile hydrocarbon content is between 0.1 and 0.9 weight percent.

13 Claims, No Drawings

DRY OLEFIN POLYMERIZATION CATALYST

BACKGROUND OF THE INVENTION

This invention relates to catalyst systems useful for polymerizing alpha-olefins and particularly relates to a supported titanium halide catalyst component and a catalyst system containing such component and more particularly to a dry solid catalyst component.

Magnesium-containing supported titanium halide-based alpha-olefin polymerization catalyst components are now well known in the art. Typically, these catalysts are recognized for their performance based on activity and stereospecificity. However, commercial olefin polymerization, especially gas-phase alpha-olefin polymerization, requires additional catalyst attributes for economical large-scale operation.

One such attribute is the ability to store and transport catalyst components without significant amounts of volatile hydrocarbon contents. As prepared, such titanium halide based components contain significant amounts of volatile hydrocarbons from either reactant diluents or wash liquids. Since transporting materials containing volatile hydrocarbons such as hexane pose a safety concern, it is advantageous to reduce the amounts of these volatile compounds. Another incentive to produce a relatively dry catalyst component is adding measured amounts of catalyst component to a reactor, since the amount of volatile hydrocarbons may vary. However, in U.S. Pat. No. 4,290,915 previous magnesium-titanium-halide supported catalysts have been found to require more than 1 wt. % hydrocarbon for optimum performance.

The present invention incorporates a series of catalyst formation process steps described in U.S. Pat. No. 4,866,022 which produce a catalyst with exceptionally high activity and stereospecificity combined with very good morphology and which may be dried to less than 1 wt. % volatile hydrocarbon and maintain catalyst performance.

SUMMARY OF THE INVENTION

A solid hydrocarbon-insoluble, alpha-olefin polymerization catalyst component with superior activity, stereospecificity and morphology characteristics comprising the product formed by A) forming a solution of a magnesium-containing species from a magnesium alkyl (or hydrocarbyl) carbonate or a magnesium carboxylate; B) precipitating solid particles from such solution by treatment with a transition metal halide; C) reprecipitating such solid particles from a mixture containing a cyclic ether; D) treating the reprecipitated particles with a transition metal compound and an electron donor; and E) drying the resulting solid particles such that the residual volatile hydrocarbon content is between 0.1 and 0.9 weight percent.

BRIEF DESCRIPTION OF THE INVENTION

The invention described herein is based on a catalyst component described in U.S. Pat. Nos. 4,540,679, 4,612,299 and 4,866,022, assigned to common assignee and all incorporated by reference herein.

It has been found that first forming a solid precipitate from such solubilized magnesium species with a titanium halide in the presence of a morphology-controlling agent such as an organosilane, produces a precipitate with a uniform particle size. In another aspect of that invention, it had been found that the catalyst component may be improved by reprecipitating the solid precipitate formed as described above from a solution containing a cyclic ether such as tetrahydrofuran (THF). The reprecipitated solid particles have a narrow particle size distribution and form a catalyst with very high activity and stereospecificity together with high bulk density. To form a suitable catalyst component, the reprecipitated solid described above was treated with a Ti(IV) species in the presence of an electron donor.

Elemental analysis of the resulting solid catalyst component shows that the material is a magnesium, titanium chloride containing organic species.

Typically, such solid component is prepared in batches, stored and later used in olefin polymerization. In addition the solid component may be transported from a catalyst manufacturing facility to an olefin polymerization unit. Although the solid component may be stored as a slurry in a diluent such as hexane, it is advantageous if the solid can be stored and transported as a dry, or relatively dry, material and not as a slurry.

U.S. Pat. No. 4,290,915 teaches that solid magnesium-titanium-chloride-based olefin polymerization catalyst components may be partially dried. However, this reference insists that the liquid hydrocarbon content in such catalyst component should be more than 1 wt. %. In fact, the reference teaches that for best performance the liquid hydrocarbon content in such solid components should be 1 to 25 wt. %.

In contrast to the teaching of U.S. Pat. No. 4,290,915, it has been found that solid catalyst components of this invention show good and in many cases improved performance if dried to a residual volatile hydrocarbon content of less than 0.9 wt. %, preferably about 0.1 to 0.9 wt. % and most preferably about 0.3 to 0.8 wt. %. This is unexpected from the clear teaching of the reference patent which demands a volatile hydrocarbon content in magnesium-titanium-halide catalyst component above 1 wt. %.

The solid catalyst component of this invention may be dried according to methods known to the art. In a typical procedure, solid catalyst component in a liquid hydrocarbon (such as hexane) is filtered and the resulting filter cake further dried by passing a heated inert gas such as nitrogen through the solid.

In more detail, a typical laboratory drying procedure is to place an amount of solid catalyst component of the invention contained in a hexane slurry on a sintered glass filter within a closed nitrogen-filled apparatus. The slurry is pressure filtered from the top at a typical pressure of 3 psig (pounds per square inch gauge) and a typical gas flow rate of 15 scfh (standard cubic feet per hour). Pressure filtering is continued until no more drops of hexane can be seen at which point the settled bed of solids does not appear to be wet unless stirred.

The nitrogen flow is reversed such that gas passes through the filter cake typically at a rate of 1 to 20 scfh. The time at which the catalyst bed appears dry and flowing in the gas or becomes fluidized is designated as the "drying point." After the drying point, nitrogen continues to flow at ambient or raised temperatures until the liquid hydrocarbon in the catalyst component is reduced to a desired level. Typically, the drying temperature can be about 25° to 80° C. or higher and preferably from about 35° to 65° C. As the depth of the filter cake increases, the drying temperature can be increased to shorten the required drying time. Typical drying times are about 0.5 to 6 hours with shorter drying times preferred such as about 1 to 3 hours.

The residual volatile hydrocarbon content is measured as the weight difference between a sample and that sample either evacuated to 0.01-0.02 Torr or heated to 70° C. and evacuated to about 30 mm Hg for 0.5 hour. These treatments are continued to constant weight.

Catalyst components of this invention may be prepared by precipitating a first solid material from a hydrocarbon medium by treating a magnesium hydrocarbyl carbonate or carboxylate composition with a transition metal compound, preferably in the presence of a morphology-controlling agent such as an organosilane compound. The first precipitated solid is reprecipitated from a medium containing a cyclic ether such as tetrahydrofuran (THF) to form uniform solid particles. The resulting particles are retreated with a suitable Ti(IV) compound and a suitable electron donor to form an olefin polymerization catalyst component. Such component may be combined with a suitable aluminum alkyl compound together with suitable modifier compounds to form a catalyst system useful to polymerize olefins, especially propylene. Using the catalyst of this invention, polymer particles with a narrow particle size distribution in high yield and stereospecificity may be obtained.

In one aspect of this invention, a soluble magnesium-containing species is formed. Soluble magnesium hydrocarbyl carbonates and carboxylates useful in this invention include those described in U.S. Pat. Nos. 4,540,679, 4,612,299 and 4,866,022, assigned to a common assignee, all incorporated by reference herein. Typically, magnesium hydrocarbyl carbonate solutions are formed in a suitable diluent by treating a magnesium compound with carbon dioxide, preferably in the presence of a suitable solvating agent such as an alcohol. For example, magnesium hydrocarbyl carbonate solutions can be formed by suspending magnesium alkoxide, such as magnesium ethoxide, in an alcohol medium and adding carbon dioxide until the magnesium ethoxide dissolved to form magnesium ethyl carbonate species. Also, magnesium alkoxide solution with an alcohol can be used.

In inert suspending medium the magnesium hydrocarbyl alcoholates are converted into magnesium hydrocarbyl carbonate salts on the addition of carbon dioxide. spherical forms of magnesium alkoxides can be used, if desired, particularly when an alcoholic medium is not employed for the carbonation step. Reaction of a magnesium alcoholate compound with carbon dioxide can be represented as follows:

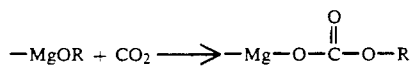

where R is a hydrocarbyl group of 1 to 20 carbon atoms.

Alternatively, a solution of a magnesium hydrocarbyl compound with carbon dioxide may be used in this invention. Reaction of a magnesium hydrocarbyl compound with carbon dioxide to form a magnesium hydrocarbyl carbonate can be represented as follows:

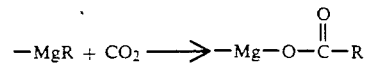

where R is a hydrocarbyl group of 1 to 20 carbon atoms. It has been found that sulfur dioxide can be substituted for carbon dioxide in forming solubilized magnesium compounds. Hydrocarbyl magnesium compound useful in this invention have the structure R-Mg-Q wherein Q is hydrogen, halogen or R' (each R' is independently a hydrocarbyl group ob 1 to 20 carbon atoms.) Dihydrocarbyl magnesium compounds preferred for use in this invention are those of the formula Mg(R')$_2$ wherein R' is as defined above. In terms of catalytic activity and stereospecificity, best results are achieved through the use of hydrocarbyl magnesium halide compounds of the formula Mg(R')Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide. Preferably, suitable magnesium compounds are free of magnesium hydroxide and magnesium carbonate impurities.

Alcohols useful in solvating magnesium hydrocarbyl carbonate and carboxylates include those having the structure HOR' wherein R' is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used such as methanol, ethanol, propanol, isopropanol, tert-butyl alcohol, cyclohexanol, 2-ethylhexanol, dodecanol, and the like. Of these, 2-ethyl-1-hexanol is preferred.

In another aspect of this invention, a magnesium hydrocarbyl carbonate or carboxylate solution is treated with a transition metal halide, preferably a titanium(IV) halide to precipitate a first solid component. Titanium tetrachloride is most preferred. Preferably, such treatment is performed in a toluene-based diluent and preferably in the presence of an organosilane.

It has been found that incorporation of suitable organosilanes is useful in preparing solid catalyst components with acceptable morphology, i.e., with particle distributions not containing excessive amounts of fines or large particles. Suitable organosilanes useful as reagents in precipitating a solid from a soluble magnesium species according to this invention have a formula: $R_nSiR'_{4-n}$, wherein $n=0$ to 4 and wherein R is hydrogen or an alkyl, alkoxy, haloalkyl or aryl radical containing one to about ten carbon atoms or a halosilyl radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an —OR radical containing one to four carbon atoms. A suitable organosilane may contain different R' groups. Mixtures of organosilanes may be used. Preferable organosilanes include trimethylchlorosilane, trimethylethoxysilane, dimethyldichlorosilane and tetraethoxysilane.

In preparation of the stereospecific supported catalyst components of this invention, typically, the soluble magnesium-containing species, titanium(IV) halide component and organosilane component are contacted in amounts such that the atomic ratio of magnesium to titanium is at least about 0.3:1 and preferably, is from about 0.4:1 to about 20:1 and more preferably, from about 0.5:1 to about 3:1. The Si/Ti atomic ratio typically can range from about 0.1:1 to about 2:1 and preferably is about 0.3:1 to about 1:1.

In another aspect of this invention, the first precipitated solid is reprecipitated from a solution containing a cyclic ether. In a typical reprecipitation procedure, the first solid is entirely solubilized in the cyclic ether solvent and then solid is allowed to reprecipitate to form particles of uniform size. The preferable ether is tetrahydrofuran, although other suitable cyclic ethers, such as tetrahydropyran and 2-methyltetrahydrofuran, may be used, which can solubilize the first solid material. Also, thioethers such as tetrahydrothiophene can be used. In some instances, such as the use of 2,2,5,5-tetramethyltetrahydrofuran and tetrahydropyran-2-methanol, reprecipitation occurs upon heating to about 130°–185° F. Other compounds may be used which act in an equivalent manner, i.e., materials which can solubilize the first solid and from which solid uniform particles can be reprecipitated, such as cyclohexene oxide, cyclohexanone, ethyl acetate and phenyl acetate. Mixtures of suitable materials may be used.

In another aspect of this invention, the reprecipitated solid is treated with a titanium(IV) compound in the presence of a suitable electron donor. In one procedure a two-step method is used in which the reprecipitated solid is treated first with a Ti(IV) component and then with the Ti(IV) component combined with a suitable electron donor. Although, typically, solid is separated from the first Ti(IV)-containing solution before a second treatment with Ti(IV) component and electron donor, an alternative procedure can be to react the reprecipitated solid with Ti(IV) compound and then add the electron donor.

Also, this treatment can be performed in a one-step procedure in which the precipitated controlled morphology support is agitated with a suitable solvent such as chlorobenzene and TiCl$_4$, followed by addition, without decantation, of chlorobenzene, TiCl$_4$ and an electron donor, followed by more chlorobenzene, before separating, washing and drying.

Organic electron donors useful in preparation of stereospecific supported catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

The preferred electron donor compounds include esters of aromatic acids. Preferred organic electron donors according to this invention are $C_1$–$C_6$ alkyl esters of aromatic mono- and dicarboxylic acids and halogen-, hydroxyl-, oxo-, alkyl-, alkoxy-, aryl-, and aryloxy-substituted aromatic mono- and dicarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferably esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbutylphthalate, di-t-butylphthalate, and di-n-butylphthalate, and mixtures thereof.

Titanium(IV) compounds useful in treating the reprecipitated solid particles of this invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Titanium tetrahalides, particularly titanium tetrachloride (TiCl$_4$), are most preferred.

The electron donor component used in preparation of the solid catalyst component is used in an amount ranging from about 0.001 to about 1.0 mole per gram atom of titanium, and preferably from about 0.005 to about 0.8 mole per gram atom. Best results are achieved when this ratio ranges from about 0.01 to about 0.6 mole per gram atom of titanium.

Typical suitable diluents useful in this invention are aromatic or substituted aromatic liquids, although other hydrocarbon-based liquids may be used. Aromatic hydrocarbons, such as toluene, and substituted aromatics, such as chlorobenzene, have been found suitable. Another suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G which is a $C_{10}$-average isoparaffinic hydrocarbon boiling at 156°–176° C. A suitable diluent should boil at a high enough temperature to promote reaction and not adversely affect resulting catalyst performance.

Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

In a preferred process, solvents from the treatment steps may be recycled to other parts of the process. Thus, supernatant and filtrates may be recycled, typically after removal of solids, either to other treatment steps in which a hydrocarbon solvent and TiCl$_4$ are present or in a closed loop to the same treatment step. Such recycling is beneficial in minimizing waste product. It is possible to treat a recycled stream containing a TiCl$_4$·THF or other complex with a phthalate to yield a TiCl$_4$·phthalate complex which can be used in a treatment step.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 2 to about 3 wt. % titanium, from about 15 to about 21 wt. % magnesium and from about 55 to about 65 wt. % chlorine.

One unusual aspect of the titanium-containing component particles prepared according to the preferred method of this invention is that the particles have a cubic shape.

The titanium-containing catalyst component of this invention may be prepolymerized with an alpha-olefin before use as a polymerization catalyst component. In prepolymerization, catalyst and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity, and attrition resistance. A particularly useful prepolymerization procedure is described in U.S. Pat. No. 4,579,836, incorporated herein by reference.

The titanium-containing catalyst component of this invention is used in a polymerization catalyst containing a cocatalyst component including a Group II or III metal alkyl and, typically, one or more modifier compounds.

Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

A typical catalyst composition is formed by combining the supported titanium-containing compound described in this invention and an alkyl aluminum compound together with modifiers including an electron donor and, preferably, a silane. Typically, useful aluminum-to-titanium atomic ratios in such catalyst formulations are about 10 to about 500 and preferably about 30 to about 300. Typical aluminum compound-to-electron donor molar ratios are about 5 to about 40. Typical aluminum-to-silane compound molar ratios are about 8 to about 30.

To maximize catalyst activity and stereospecificity, it is preferred to incorporate one or more modifiers, typically electron donors, and including compounds such as silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acids, phthalic acid, isophthalic acid, terephthalic acid, and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate,, methyl anisate, ethyl anisate, methyl p-toluate, hexyl benzoate, and cyclohexyl benzoate, and diisobutyl phthalate as these give good results in terms of activity and stereospecificity and are convenient to use.

The polymerization cocatalyst useful in this invention advantageously contains an aliphatic or aromatic silane modifier. Preferable silanes useful in cocatalysts in this invention include alkyl-, aryl-, and/or alkoxy-substituted silanes containing hydrocarbon moieties with one to about 20 carbon atoms. Especially preferred are silanes having a formula: $SiR_4$, wherein R is independently R' or OR' with R' having 1 to about 20 carbon atoms. Preferred aromatic silanes include diphenyldimethoxysilane, phenyltrimethoxysilane, phenylethyldimethoxysilane and methylphenyldimethoxysilane. Preferred aliphatic silanes include isobutyltrimethoxysilane, diisobutyldimethoxysilane, diisopropyldimethoxysilane, di-t-butyldimethoxysilane, and t-butyltrimethoxysilane.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.02 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, the system pressure cannot be below the vapor pressure of the alpha-olefin to be polymerized at the polymerization temperature.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propylbenzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems and are described in U.S. Pat. Nos. 3,957,448; 3,965,083; 3,971,768; 3,970,611; 4,129,701; 4,101,289; 3,652,527; and 4,003,712, all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Although the typical polyolefin produced in polypropylene, propyleneethylene random and impact copolymers, and propylene/ethylene/butene terpolymers also may be produced.

In a typical impact copolymer process, propylene is polymerized in a first reactor using the catalyst of the invention and the resulting polymer transferred to a second reactor containing a mixture of olefin such as propylene and ethylene. Polymerization continues to form an impact copolymer.

Irrespective of polymerization technique, polymerization is carried out under conditions that exclude oxygen, water, and other materials that act as catalyst poisons.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

EXAMPLES

A solid magnesium, titanium chloride-based catalyst component was prepared according to the teaching of U.S. Pat. No. 4,866,022.

A magnesium hydrocarbyl carbonate solution was formed from magnesium ethoxide, carbon dioxide in the presence of 2-ethyl-1-hexanol in toluene. This solution was precipitated by addition of titanium tetrachloride in toluene in the presence of tetraethylorthosilicate. The resulting precipitate was dissolved in tetrohydrofuran and allowed to reprecipitate. The resulting solid was washed with toluene and treated with titanium tetrachloride and then with titanium tetrachloride with di-n-butylphthalate. After further treatment of the solid with $TiCl_4$ the solid was washed with hexane and isolated.

For Example 1 and Comparative Runs A and B, a slurry containing 100 grams of catalyst was placed in a 500-milliliter glass jacketed vessel containing a 6-centimeter-diameter, medium sintered glass filter with an 18 centimeter kettle height. The top of the vessel had both a 24/40 and 34/45 joints while below the frit was about a 100-milliliter jacketed volume with two vertically aligned 3-way stopcocks. The side arm of the top stopcock was connected to the heated nitrogen supply while the side arm of the bottom stopcock permitted drainage of filtrate. Thermocouples were placed at the bottom of the sintered glass filter. Nitrogen was heated by passing through 20 feet of quarter-inch coiled copper tubing submerged in heated oil. The slurry was pressure filtered from the top with nitrogen (3 psig 15 scfh) until no more visual drops of hexane could be seen. The nitrogen flow (4.55 scfh) then was reversed and the beginning time noted. The nitrogen coil bath temperature was 106° C. and the temperature above and below the filter were measured at 58° and 60° C., respectively. When the bed became dry and flowing or became fluidized, the time was noted as the "drying point." the drying point occurred 40 minutes after the beginning time. Dry, heated nitrogen was allowed to continue beyond the drying point and catalyst samples were taken at various times and measured for hexane content and tested for catalytic performance.

In Example 2 and Comparative Runs D-F catalyst slurry was placed in a 1800-milliliter drying apparatus containing a 12 centimeter diameter medium sintered glass filter operated in a manner as described above.

This larger apparatus had a removable resin kettle lid with a ground glass flange which could be clamped to the bottom apparatus and was adapted to contain two 34/45 joints and one 24/40 joint. This apparatus had a side arm with glass valves to permit transfer of catalyst particle to a receiving flask.

The solid titanium-containing catalyst components prepared above were tested in batch hexane-slurry or by gas-phase propylene polymerizations. In slurry polymerization, a two-liter Parr reactor was charged with 650 milliliters of hexane, 150 psig of propylene, and 170 milliliters of hydrogen gas. About 15 milligrams of titanium-containing catalyst component together with a triethylaluminum (TEA)-based cocatalyst system including an diisobutyldimethoxysilane cocatalyst modifier were used in the polymerization test run for two hours at 71° C.

Specifically, a two-liter Parr reactor was charged with 40 psig of propylene, then 7 mmoles of hydrogen, and the temperature was raised to about 43° C. The catalyst system was formed from a mixture of 2.5 milliliter of 1.56 molar TEA in hexane, 2.0 milliliters of 0.1 molar organosilane in hexane, 15 milligrams of titanium-containing catalyst component and 5 milliliters of additional hexane. The resulting mixture was flushed into the reactor with 650 milliliters of hexane. The reactor temperature was raised to 71° C. and the reactor was pressurized to 150 psig with propylene. Polymerization continued at this temperature and pressure for two hours. Results of the slurry-phase polymerization are shown in Table 1. "Yield" (grams of polymer produced per gram of solid catalyst component) was determined by magnesium analysis of the polymer product. "Extractables" were determined by measuring the loss in weight of a dry sample of ground polymer after being extracted in boiling n-hexane for three to six hours. Hexane "Solubles" were determined by evaporation of the filtrate to dryness and weighing the residue.

A series of batch gas phase propylene polymerizations also were performed using the titanium-containing components prepared above in a 2.5-liter stirred reactor at 71° C. at 300 psig including 36 mmol of hydrogen with stirring at 40 rpm with a reaction time of 2 hours. Triethylaluminum (TEA) (Al/Ti=200/1) was used as a cocatalyst together with diisobutyldimethoxysilane (Si/Al=20/1) as a modifier. The reactor was charged with TEA/modifier, titanium component, hydrogen, and propylene in that order. Results are shown in Table 1.

TABLE I

| | | | | Slurry Polymerization | | | | Gas-Phase Polymerization | | |
|---|---|---|---|---|---|---|---|---|---|---|
| Ex. (Run) | Drying Point (min.) | Drying Time (min.) | $C_6$ (wt. %) | Yield (kg/g) | Solubles (wt. %) | Extractables (wt. %) | Bulk Density (lbs/ft$^3$) | Yield (kg/g) | Extractables (wt. %) | Bulk Density (lbs/ft$^3$) |
| A | 40 | 45 | 6.1 | 14.3 | 0.5 | nm | 24.6 | 22.3 | 1.0 | 26.2 |
| 1 | 40 | 120 | 0.8 | 12.6 | 0.4 | nm | 24.9 | 19.9 | 1.0 | 25.0 |
| B | 40 | 240 | 0.1 | 14.7 | 0.7 | nm | 24.9 | 18.9 | 1.0 | 25.0 |
| C | — | — | 7–8 | nm | nm | nm | nm | 20.0* | nm | 26.8 |
| D | 95 | 140 | 1.6 | 13.7 | nm | 1.1 | 26.0 | 21.3 | 0.9 | 28.0 |
| E | 137 | 182 | 1.5 | 13.9 | 0.6 | 1.0 | 25.6 | 23.1 | 1.0 | 27.8 |
| 2 | 92 | 139 | 0.7 | 13.0 | 0.4 | 1.3 | 25.5 | 29.1 | 1.1 | 26.8 |
| F | — | 300 | 0.1 | nm | nm | nm | nm | 22.2 | 0.6 | 25.1 |

*Average of two runs
nm = not measured

These data show that catalyst components of this invention give good or superior results compared to similar materials having a volatile hydrocarbon content greater than 1 wt. %.

That which is claimed is:

1. A solid, hydrocarbon-insoluble alpha-olefin polymerization catalyst component comprises a product formed by:
   A Forming a solution of a magnesium-containing species from a magnesium hydrocarbyl carbonate or a magnesium carboxylate;
   B Precipitating solid particles from such magnesium-containing solution by treatment with a transition metal halide;
   C Reprecipitating such solid particles from a solution containing a cyclic ether;
   D Treating the reprecipitated particles with a transition metal compound and an electron donor; and
   E Drying the resulting solid particles such that the residual volatile hydrocarbon content is between 0.1 and 0.9 weight percent.

2. The catalyst component of claim 1 wherein the transition metal halide in Step A is titanium tetrachloride.

3. The catalyst component of claim 1 wherein the transition metal compound in Step D is titanium tetrachloride.

4. The catalyst component of claim 1 wherein the electron donor in Step D is a dialkylphthalate.

5. The catalyst component of claim 1 wherein the cyclic ether is tetrahydrofuran.

6. The catalyst component of claim 1 wherein the catalyst particles are dried to a residual volatile hydrocarbon content of about 0.3 to 0.8 wt. %.

7. The catalyst component of claim 1 wherein the catalyst particles are dried by heating in a flowing inert gas.

8. The catalyst component of claim 1 wherein the catalyst particles are dried by heated in flowing nitrogen at about 25° C.–80° C.

9. A solid, hydrocarbon-insoluble alpha-olefin polymerization catalyst component comprises a product formed by:
   A Forming a solution in an alcohol medium of a magnesium-containing species formed from magnesium ethoxide and carbon dioxide
   B Precipitating solid particles from such magnesium-containing solution by treatment with titanium tetrachloride and trimethylchlorosilane, trimethylethoxysilane, dimethyldichlorosilane or tetraethoxysilane in a toluene-based solvent;
   C Reprecipitating such solid particles from a mixture containing tetrahydrofuran, tetrahydropyran or 2-methyltetrahydrofuran; and
   D Treating the reprecipitated particles with titanium tetrachloride and a dialkylphthalate ester
   E Drying the resulting solid particles such that the residual volatile hydrocarbon content is between 0.1 and 0.9 weight percent.

10. The catalyst component of claim 9 wherein the solid particles in Step C are reprecipitated from tetrahydrofuran.

11. The catalyst component of claim 10 wherein the solid catalyst particles are dried to a residual volatile hydrocarbon content of about 0.3 to 0.8 wt. %.

12. The catalyst component of claim 11 wherein the solid catalyst particle are dried by heating in a flowing inert gas.

13. The catalyst component of claim 12 wherein the catalyst particles are dried by heating in flowing nitrogen at about 25° C. to 80° C.

* * * * *

UNITED STATES PATENT AND TRADEMARK OFFICE
CERTIFICATE OF CORRECTION

PATENT NO.   :   5,081,090

DATED        :   January 14, 1992

INVENTOR(S)  :   Arzoumanidis, et al

It is certified that error appears in the above-identified patent and that said Letters Patent is hereby corrected as shown below:

Col. 3, line 45 "dissolved" should read --dissolves--.

Col. 5, line 68 "Other preferably esters" should read --Other preferable esters--.

Col. 14, line 2 "dried by heated" should read --dried by heating--.

Signed and Sealed this

Eighteenth Day of May, 1993

Attest:

MICHAEL K. KIRK

*Attesting Officer*    Acting Commissioner of Patents and Trademarks